United States Patent [19]

Saito et al.

[11] Patent Number: 4,714,966
[45] Date of Patent: Dec. 22, 1987

[54] ELECTRONIC PHOTOGRAPHY SYSTEM WITH STILL AND MOTION PICTURE MODES

[75] Inventors: Syuichiro Saito, Kanagawa; Tadashi Okino, Tokyo, both of Japan

[73] Assignee: Canon Kabushiki Kaisha

[21] Appl. No.: 559,221

[22] Filed: Dec. 8, 1983

[30] Foreign Application Priority Data

Dec. 14, 1982 [JP] Japan .............................. 57-218876

[51] Int. Cl.⁴ ...................... H04N 5/238; H04N 5/781
[52] U.S. Cl. .................................... 358/335; 358/906; 358/228
[58] Field of Search .............. 354/446, 449, 450, 451; 358/906, 335, 310, 228; 360/35.1, 33.1; 352/141

[56] References Cited

U.S. PATENT DOCUMENTS

| | | | |
|---|---|---|---|
| 3,120,161 | 2/1964 | Pickens et al. | 354/451 |
| 3,696,719 | 10/1972 | Tanikoshi | 354/451 |
| 3,818,494 | 6/1974 | Tanikoshi et al. | 354/451 |
| 3,896,461 | 7/1975 | Higuma | 354/451 |
| 4,057,830 | 11/1977 | Adcock | 358/906 |
| 4,066,347 | 1/1978 | Wagensonner | 352/141 |
| 4,101,910 | 7/1978 | Mayer | 354/451 |
| 4,131,919 | 12/1978 | Lloyd et al. | 358/906 |
| 4,134,653 | 1/1979 | Ishiguro et al. | 354/451 |
| 4,366,501 | 12/1982 | Tsunekawa et al. | 360/9.1 |
| 4,420,773 | 12/1983 | Toyoda et al. | 358/335 |
| 4,527,205 | 7/1985 | Konishi | 358/335 |
| 4,558,368 | 12/1985 | Aoki et al. | 358/228 |

FOREIGN PATENT DOCUMENTS 2916387 10/1979 Fed. Rep. of Germany ...... 358/906

Primary Examiner—Aristotelis M. Psitos
Assistant Examiner—Robert A. Weinhardt
Attorney, Agent, or Firm—Toren, McGeady & Associates

[57] ABSTRACT

An electronic still/motion picture photography system includes an optical-electronic transducer for producing electrical signals responsive to an optical image, a light information control member such as a diaphragm for controlling the state of the light information incident on the transducer, a discriminating circuit for determining the state of the light information as it is controlled by the light information control member, a drive source responsive to the output of the discriminating circuit for driving the light information control member, a recorder for recording the output of the transducer, an indicating switch for indicating the amount of output representing the exposed image to be recorded by the recorder, and a computer circuit responsive to the output of the indicating switch for changing the driving characteristics of the drive source.

30 Claims, 6 Drawing Figures

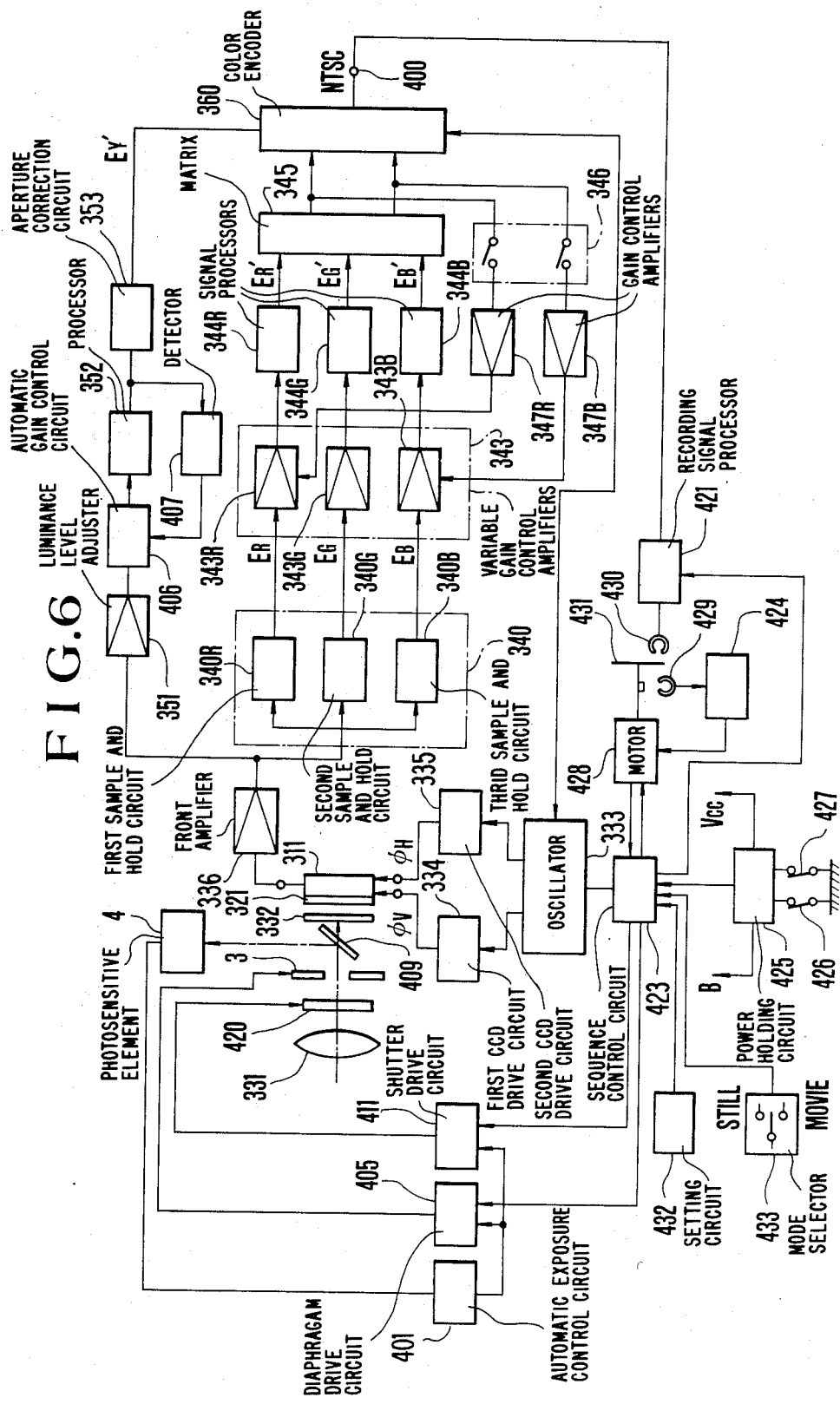

4,714,966

ELECTRONIC PHOTOGRAPHY SYSTEM WITH STILL AND MOTION PICTURE MODES

BACKGROUND OF THE INVENTION

1. Field of the Invention

This invention relates to an electronic photography system having still and motion picture modes.

2. Description of the Prior Art

It is known in the art to provide a so-called electronic camera with therein a CCD image sensor for producing electronic signals responsive to an optical image which are then recorded on a magnetic drum or magnetic disc.

To utilize the function of such electronic camera effectively, one should be able to use the output of the electronic camera as an input signal source of commercially available VTRs by connecting the two with an adaptor. It has, however, been found that when the VTR of continuous recording capability is supplied with the output of the electronic camera, the exposure control device such as the diaphragm device of the electronic camera cannot work with suitable responsiveness.

In other words, since the exposure control device of the electronic camera is designed to take a still picture, the exposure control must be made in delicately responsive to changes of the brightness of an object to be photographed. For example, where a moving person is to be photographed, even when a shutter release is actuated as soon as that person has entered from under the glaring sun into the shadow of trees, the requirement of obtaining a proper exposure must always be satisfied.

Such an electronic camera when coupled with the VTR, when panned, produces an ugly picture because the level of brightness of the scene suddenly changes at frequent intervals with corresponding changes of the exposure value. This problem arises not only from light response characteristics of the diaphragm control but also from those of the shutter control and focusing control. An electronic camera which has overcome the above-described drawbacks has not as yet been conceived.

SUMMARY OF THE INVENTION

An object of the present invention is to provide an image pickup device which overcomes the drawbacks of the conventional technique.

Another object of the invention is to provide a diaphragm control device having controllable response characteristic.

Still another object of the invention is to provide an electronic photography system in which the control characteristic of the diaphragm or the like properly changes depending upon the amount of image to be recorded.

BREIF DESCRIPTION OF THE DRAWINGS

FIG. 6 is a block diagram of an electronic photography system of the invention.

DETAILED DESCRIPTION OF THE PREFERRED EMBODIMENTS

Figure 1:
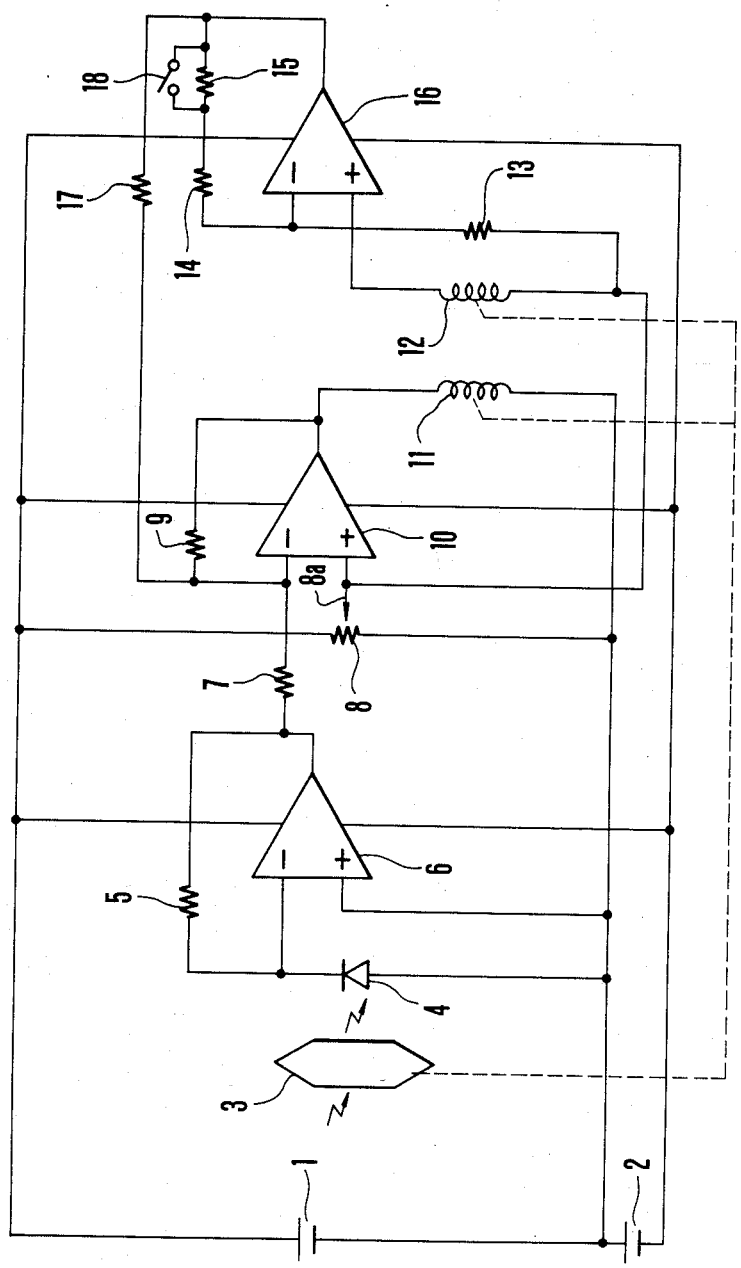
FIG. 1 is an electrical circuit diagram of a diaphragm control usable in a first embodiment of an image pickup device according to the invention.

The present invention will be described in connection with embodiments thereof by reference to the accompanying drawings. Referring first to FIG. 1, there is shown a first embodiment of the invention. In this embodiment, light from an object to be photographed passes through an electromagnetically operated diaphragm to a light metering circuit. Whether the output of the light metering circuit is above or below a prescribed level sensed by a discriminating circuit is detected to indicate the direction in which the aforesaid diaphragm must be moved. The aforesaid discriminating circuit is provided with a signal forming circuit for changing the input signal to the discriminating circuit. The signal forming circuit, when rendered operative alters, the speed of movement of the diaphragm.

In FIG. 1, two batteries 1 and 2 are connected in series with each other. Three operational amplifiers 6, 10 and 16 each are connected in parallel to the batteries 1 and 2. A non-inverting input terminal of operational amplifier 6 is connected to a junction point of batteries 1 and 2 (hereinafter called circuit earth or ground), an inverting input terminal which is connected through a photosensitive element 4 as light receiving means to ground, and also through a resistor 5 to an output terminal thereof. The photosensitive element 4, resistor 5 and operational amplifier 6 constitute a light metering circuit in the form of a photoelectric transducing amplifier for producing an output in the form of a voltage proportional to the intensity of light entering through an opening aperture of diaphragm blades 3 as a diaphragm member to the photosensitive element 4, as is well known in the art. A non-inverting input of operational amplifier 10 is connected to a slider 8a of a variable resistor 8 which is connected across the positive terminal of battery 1 and the circuit earth. An inverting input of operational amplifier 10 is connected through a resistor 7 to the output of operational amplifier 6. An output of operational amplifier 10 is connected to a diaphragm driving coil 11 as driving means and therefrom to the circuit earth, and is also connected through a resistor 9 to the inversion input thereof. The coil 11 cooperates with a movable member or a permanent magnet 57. The variable resistor 8, resistor 9 and operational amplifier 10 constitute a discriminating circuit serving as discriminating means. The driving coil 11 is arranged so that when the output of operational amplifier 10 is of negative voltage, the size of opening aperture of the diaphragm decreases, and when of positive voltage, it increases. A diaphragm braking coil 12 which also serves as speed sensing means for the diaphragm is connected at one end thereof to a non-inversting input of the operational amplifier 16 and at the opposite end to the non-inverting input of operational amplifier 10. An inverting input of operational amplifier 16 is connected through a resistor 13 to the non-inversion input of operational amplifier 10, and also through a string of resistors 14 and 15 to an output thereof. Therefore, the operational amplifier 10 constitutes a subtracting circuit for the signals from the photosensitive element 4 and braking coil 12. Also the braking coil 12 constitutes part of means for sensing the speed of rotation of the permanent magnet 57 to be more fully described later as the deflecting member the speed of which corresponds to the speed of movement of the diaphragm blades. As the diaphragm closes down, the braking coil 12 exerts a positive electromotive force of magnitude proportional to the speed of movement of the diaphragm. As it is opening, a negative electromotive force is exerted. The output of operational amplifier 16 is connected through a resistor 17 to the inverting input of operational amplifier 10. A switch 18 as a mode selector is connected across the aforesaid resistor 15. When switch 18 is OFF, a first computation mode is selected to operate so that the response speed of the diaphragm is relatively fast, and when ON, it becomes relatively slow. As will be more fully described later, this switch 18 is turned on when in a still picture mode, and off when in a movie picture mode. It is also to be noted that the resistors 5, 7, 8, 9, 13, 14, 15 and 17 and operational amplifiers 6, 10 and 16 form computer means. Again, the diaphragm 3 controls the aperture adjustment for light information given to an image sensor 311 as an image pickup means to be described later, and functions as light information control means. As the light information control means, besides this, a shutter and optical lens are included.

The operation of the circuit of FIG. 1 is as follows: When a power switch (not shown) is thrown, a voltage of magnitude proportional to the intensity of light incident upon photosensitive element 4 after having passed through the aperture opening of diaphragm 3 is generated at the output of operational amplifier 6.

Assuming that the incident light is so strong that the output voltage of operational amplifier 6 is higher than the divided potential appearing at the slider 8a of variable resistor 8, then the output of operational amplifier 6 is inverted by operational amplifier 10, while being amplified. The output of operational amplifier 10 in the form of a negative voltage is applied to the driving coil 11, so the diaphragm 3 is driven to close down the size of its aperture. As a result, the illumination on the photosensitive element 4 is weakened. As the diaphragm 3 moves in a direction to close down, as has been described before, the braking coil 12 generates a positive electromotive force which is then applied to the non-inverting input of operational amplifier 16. Responsive to this, operational amplifier 16 produces an output in the form of a negative voltage. This negative voltage is fed back through resistor 17 to the inversion input terminal of operational amplifier 10, where that negative voltage is inverted and amplified to form a positive voltage component. Thus, it is during the closing operation of the diaphragm 3 that the value of voltage appearing at the output of operational amplifier 10 is equal to the added value of the negative voltage from operational amplifier 6 and the positive voltage from operational amplifier 16. Therefore, the current flowing through the driving coil 11 is reduced by a corresponding magnitude to the electromotive force generated in braking coil 12 to slow down the speed of motion of the diaphragm 3.

Letting R13, R14 and R15 denote the values of resistors 13, 14 and 15, we have the following values of non-inverting amplification gain of operational amplifier 16, $$\left(1 + \frac{R14 + R15}{R13}\right)$$

when switch 18 is OFF, and $$\left(1 + \frac{R14}{R13}\right)$$

when switch 18 is ON. For the first operation mode, switch 18 is set in OFF state. Because of the gain being higher, under the condition that the electromotive force exerted in the braking coil 12 is of the same magnitude, a higher braking voltage is produced at the output of operational amplifier 16, causing the ratio of the signal level from braking coil 12 to the signal level from the photosensitive element 4 to increase with decrease in the intensity of current flowing to the driving coil 11. In effect, the diaphragm 3 is driven at a slower speed. For the second operation mode, switch 18 is turned on, thereby the response speed of the diaphragm 3 can be made faster.

Alternatively assuming that the output voltage of operational amplifier 6 is lower than the divided voltage appearing at the slider 8a of variable resistor 8 and applied to the non-inversion input of operational amplifier 10, then operational amplifier 10 produces another output in the form of a positive voltage. Responsive to this, driving coil 11 does open the diaphragm 3. As the diaphragm 3 is opening, a negative electromotive force is generated in braking coil 12, and after having been non-inverted and amplified by operational amplifier 16 is fed back to operational amplifier 10, thereby the positive voltage at the output of operational amplifier 10, or the driving voltage for the coil 11, is reduced to slow down motion of the diaphragm 3. An effect is similar to that described in connection with the closing operation of the diaphragm. It is also similar that when switch 18 is OFF, the gain of operational amplifier 16 is higher, and the speed of movement of the diaphragm 3 is slower, than when switch 18 is ON.

Figure 2:
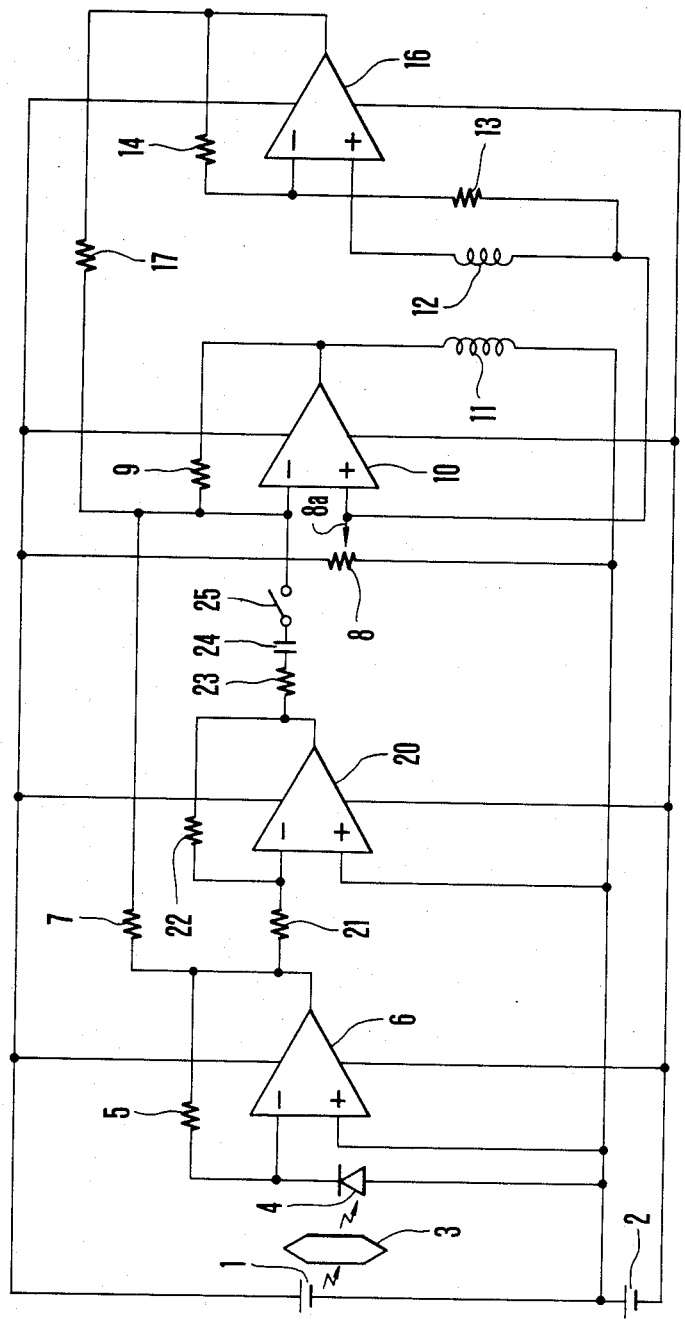
FIG. 2 is similar to FIG. 1 except that a second embodiment is illustrated.

A second embodiment of the invention is shown in FIG. 2 where the same reference characters have been employed to denote the similar parts to those shown in FIG. 1, and their detailed explanation is omitted.

The circuit of FIG. 2 is different from that of FIG. 1 in that the resistor 15 and the switch 18 are taken off, and instead one more operational amplifier 20 is added in parallel connection to the resistor 7. A non-inverting input of operational amplifier 20 is connected to the circuit earth, an inverting input of which is connected through a resistor 21 to the output of operational amplifier 6 and also through a resistor 22 to an output terminal thereof. The output of operational amplifier 20 is further connected through a resistor 23, a capacitor 24 and an operation mode selection means or switch 25 which are connected in series with each other to the inverting input of operational amplifier.

In this embodiment, resistors 5, 7, 8, 9, 13, 14, 17, 21, 22 and 23, operational amplifiers 6, 10, 16 and 20 and capacitor 24 constitute operation means.

It is also to be noted that the switch 25 functions to change over between frequency characteristics in the path from amplifier 6 to amplifier 10.

The operation of the circuit of FIG. 2 is as follows: When the still picture mode is set by means to be described later, switch 25 is turned off and the first operation mode is set. Then the circuit operates in a similar manner to that described in connection with FIG. 1. Conversely when the motion picture mode is set, the switch 25 is turned on, thereby the second opetation mode is set. In a situation where the object brightness does not vary with time, therefore, because the operational amplifier 20 is cut off by capacitor 24, similarly to FIG. 1, the size of opening aperture of the diaphragm 3 is adjusted to a presetting for a prescribed level of illumination on the photosensitive element 4 and is held stable in this position.

Let us suppose that the ambient light starts to change from this state. Since in this case the intensity of light incident on the photosensitive element 4 changes, the output voltage of operational amplifier 6 also changes. Under the condition that the resistors 21 and 22 have resistance values equal to each other, and the resistors 7 and 23 also have an equal resistance values equal to each other, the output voltage of operational amplifier 6 is inverted and amplified to a gain of unity by operational amplifier 20. Therefore, a voltage of opposite sign to, and equal in absolute value to, those of the output of operational amplifier 6 appears at the output of operational amplifier 20. Then, as the output of operational amplifier 6 changes, the output of operational amplifier 20 is changed in the opposite direction by the same difference in absolute magnitude. As a result, soon after the change has started, operational amplifiers 6 and 20 produce outputs of opposite sign but equal to each other in the absolute value which are then applied through the respective resistors 7 and 23 having an equal resistance value to each other to operational amplifier 10, where they cancel each other. Being reluctant to follow up the change of the illumination, therefore, the diaphragm does not change its aperture immediately. As charging of capacitor 24 through resistor 23 goes on, however, the cancelling effect is gradually being lost, allowing the diaphragm 3 to change aperture so as to maintain the constant level of illumination on the photosensitive element 4. Determination of this cancelling time can be made as desired by taking the time constant of resistor 23 and capacitor 24 at an appropriate value. It will be appreciated that even by this method, the change in the force of inertia of the diaphragm against the rapid variation with time of the illumination can be achieved.

Figure 3:
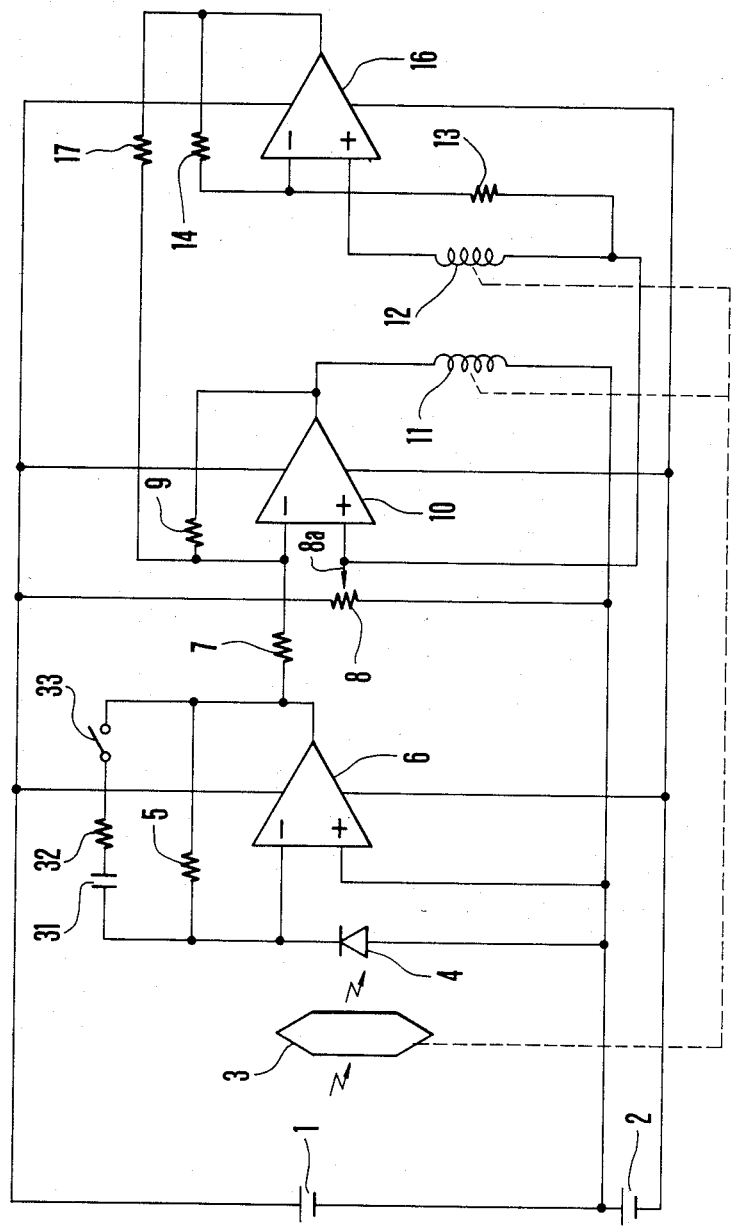
FIG. 3 is similar to FIG. 1 except that a third embodiment is illustrated.

A third embodiment of the invention is shown in FIG. 3 wherein the same reference characters have been employed to denote the similar parts to those shown in FIG. 1.

The circuit of FIG. 3 is different from that of FIG. 1 in that the resistor 15 and switch 18 are taken off and instead a series circuit of a capacitor 31, a resistor 32 and a switch 33 as mode control means is connected in parallel to the resistor 5. The resistance value of the resistor 32 is far smaller than that of the resistor 5.

In this embodiment, resistors 5, 7, 8, 9, 13, 14, 17 and 32, amplifiers 6, 10 and 16 and capacitor 31 constitute computer means.

It is also to be noted that even in this embodiment, the frequency characteristic in the operation means is altered by ON and OFF operation of switch 33 as the mode control means.

The operation of the circuit of FIG. 3 is as follows: When in the still picture mode, switch 33 is OFF, and the circuit operates in a similar manner to that described in connection with FIG. 1. When switched to the motion picture mode, switch 33 is turned on. It is in this position that no variation with time of the illumination lets capacitor 31 to become as if it were absent, and the diaphragm 3 is kept in a stable equilibrium for the illumination on the photosensitive element 4 at a prescribed level. Then when the degree of illumination starts to rapidly change, operational amplifier 6 would otherwise change its output voltage correspondently. Because of the necessity of charging capacitor 31, however, the output voltage cannot change so fast. Therefore, during the time necessary to fully charge capacitor 31, diaphragm 3 is slowly accelerated. The charging time constant is determined by the static capacitance of capacitor 31 and the resistance value of resistor 5. For a desired acceleration is obtained, it is only necessary to adjust the capacitance and resistance to appropriate values. It is also to be noted that resistor 32 has a function of returning the phase rotation in the high-frequency wave to zero and is to strengthen the stabilization of the system, but may be omitted provided that a sufficient stability of the system is secured without it.

It will be appreciated that even the circuit of FIG. 3 can control the acceleration of the diaphragm by the ON and OFF operation of switch 33 responsive to setting of either one of the still and motion picture modes so that when in the motion picture mode a buffering action against the rapid change of the ambient light with time is brought in.

Figure 4:
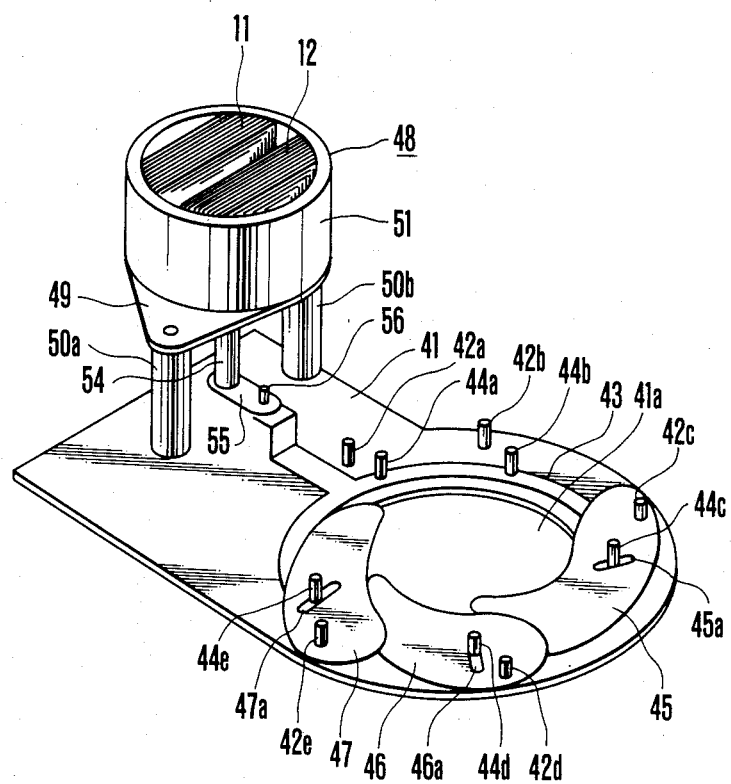
FIG. 4 is a perspective view of an example of the diaphragm.

Here, FIG. 4 illustrates the diaphragm whose operation is controlled by the circuit of FIG. 1 to FIG. 3. For the purpose of better understanding, some of the diaphragm blades and a cover therefore are removed.

In FIG. 4, a base plate 41 with an aperture 41a fixedly carries five pivot pins 42a to 42e on which respective blades 45, 46 and 47 (the remaining two blades being not shown) are movably mounted. A sector ring 43 is rotatably mounted on the base plate 41 in concentric relation to the round aperture 41a and fixedly carries linkage pins 44a to 44e extending through and projecting beyond respective slots 45a to 47a in the diaphragm blades 45 to 47. Member 48 is a drive portion; 49 is a support having two legs 50a and 50b; 51 is a yoke; 11 is the driving coil as the driving means; 12 is the braking coil 54 is an output shaft to which is connected a lever 55. This lever 55 is drivingly connected through a pin 56 to the sector ring 43.

Figure 5:
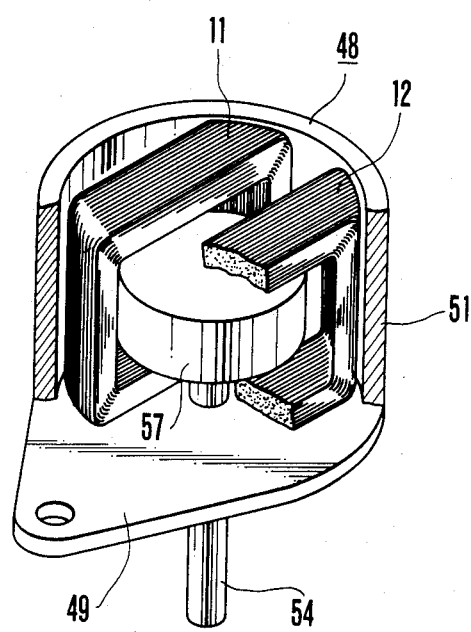
FIG. 5 illustrates the details of the driving portion of the diaphragm of FIG. 4.

FIG. 5 shows the internal mechanism of the drive unit 48 where the before-mentioned deflecting member takes the form of a rotor of permanent magnet with the poles oriented diametrically. When the driving coil 11 is supplied with current, the magnetic field of permanent magnet 57 interacts with the current flowing through that magnetic field to exert a force according to Fleming's left-hand rule. As the permanent magnet rotor 57 reacts, the output shaft 54 rotates in a clockwise direction as viewed in the drawing.

Motion of the output shaft 54 is transmitted through lever 55 and pin 56 to turn sector ring 43 counterclockwise, and therefrom through linkage pins 44a to 44e to turn diaphragm blades about pivot pins 42a to 42e clockwise, to the size of aperture defined by the blades is decreased. Such movement of the permanent magnet 57 in turn causes generation of an electromotive force in the braking coil 12 by which overrunning of the diaphragm blades is restricted.

As has been described in greater detail above, according to the present invention, adjustment of the illumination on the image sensor in the camera to a prescribed level can be automatically controlled in such a way that when the intensity of light on the photosensitive element is high, the diaphragm is closed down, and when it is low, it is opened. Another feature is that as the object brightness starts to vary from the level sensed by the light metering circuit at given a speed, that when in the still picture mode that the aperture opening of the diaphragm is varied at a corresponding speed such as to maintain the illumination on the image sensor in the camera constant as if the object brightness were constant, and in the motion picture mode the aperture is varied at gradually ever-increasing speeds capable of reaching that corresponding speed during a time which can be taken at a desired value.

FIG. 6 in block diagram form illustrates an embodiment of an electronic photography system of the present invention. Light entering through a photographic objective lens 331 passes through a mechanical or solid-state-physical shutter 420, the diaphragm of the invention and an infrared cut filter 332 to impinge on a CCD image sensor 311 having a color filter 321 consisting of Red (R), Green (G) and Blue (B) stripes at the front thereof.

It is to be noted here that the CCD image sensor 311 functions as image pickup means for producing electrical information responsive to an optical image formed thereon. It is of course possible to use a vidicon, MOS image sensor or the like in place of the CCD image sensor.

An oscillator 333 produces a train of standard clock pulses which are applied to first and second CCD drive circuits 334 and 335. Responsive to vertical and horizontal transfer clock signals φV and φH respectively from circuits 334 and 335, CCD 311 produces video signals including a luminance signal and chrominance signals each in the form of a sequence of charges eR, eG or eB corresponding to the red, green or blue component of an object image. Element 336 is a front amplifier; 351 is a luminance level adjuster provided in a luminance signal line; 340 is a chrominance signal separating circuit provided in a chrominance signal line. The chrominance signal separating circuit 340 comprises a first sample and hold circuit 340R for sampling a red signal ER corresponding to the charges er responsive to the red components, a second sample and hold circuit 340G for sampling a green signal EG corresponding to the charges eg responsive to the green components, and a third sample and hold circuit 340B for sampling a blue signal EB corresponding to the charges eb responsive to the blue components, and convert the chrominance signals ER, EG and EB to synchronous signals. The chrominance signals, after their signal levels have been adjusted in relation to each other by voltage variable type gain control amplifiers 343R, 343G and 343B constituting a white balance adjuster 343, are applied to processor circuits 344R, 344G and 344B where signal treatments including gamma correction are carried out. A matrix circuit 345 receptive of the outputs ER', EG' and EB' of the signal processors 344 produces different color difference signals ER'−EG' and EB'−EG' which are then applied to a color encoder 360. The outputs of matrix circuit 345 are fed back through their respective switches 346 and gain control amplifiers 347R and 347B to the white balance adjuster 343. The color encoder 360 responsive to the standard clock pulses from the oscillator 333 synthesizes the aforesaid color difference signals and a luminance signal to be more fully described later to form an NTSC type color video signal, for example. The luminance signal line system comprises the luminance level adjuster 351, a processor circuit 352 and an aperture correction circuit 353.

An automatic exposure control circuit 401 responsive to variation of the object brightness adjusts the diaphragm 3 and/or a shutter 420 so that the NTSC signal appearing at an output terminal 400 is maintained at a suitable constant level. In this practical example, the automatic exposure control circuit 401, which may include resistors 5 and 7 and operational amplifier 6, as shown in FIG. 1, utilizes the output of the photosensitive element 4 as a half-mirror 409 splits off a portion of the light coming from the aperture of the diaphragm to the photosensitive element 4.

The conventional automatic exposure control circuits generally make use of the luminance signal of the luminance signal line system, and are constructed with a detecting portion and a control portion for converting this signal to a DC current component. Even in the present invention, such structure may be employed. However, when using the output of the luminance signal line system, this output signal is produced in the form of a sequence of discrete signals synchronizing with a field period of 1/60 sec. Thus, the responsiveness to the change of the object brightness is restricted considerably.

On this account, therefore, this photography system of the invention as has been described above makes use of the photosensitive element 4 with an advantage that the responsiveness in the still picture mode is heightened to the maximum.

The automatic gain control circuit 406 is provided for compensating the level of a signal to be taken out at the output terminal 400 as the object brightness becomes so low that the required aperture exceeds the maximum value of the diaphragm 3, or the required shutter speed exceeds the longer limit of the shutter 420. For this purpose, the operation of the automatic gain control circuit 406 is controlled by the output of a detector 407 in such a manner that when the output signal of processor 352 falls below a certain level, the gain is increased to a value depending upon the detection potential obtained from the detector 407.

Arrangement 405 is a diaphragm drive circuit, which may include resistors 8 and 9, operational amplifier 10, as well as resistores 13 to 15 and 17, operational amplifier 16 and switch 18, as shown in FIG. 1; 411 is a shutter drive circuit; 421 is a signal processing circuit receptive of the output from terminal 400 for producing a signal in a form suited for recording; 423 is a sequence control circuit controlling the operation of a video recorder comprising the recording signal processor 421, shutter drive circuit 411, diaphragm drive circuit 405 and a motor control circuit 424 to be more fully described later as a whole; 425 is a power holding circuit; 426 is a switch arranged to be closed by a first stroke of a two-stroke switch; 427 is a switch arranged to be closed by a second stroke. By turning on the switch 426, the various circuit portions of the photography system are supplied with current. By turning on the switch 427, recording on a magnetic disc 431 is carried out. Vcc is an electrical power source or battery; B is a power supply line to the various circuits; 424 is a motor control circuit; 428 is a motor of which rotation speed and phase are controlled by the motor control circuit 424; 429 is a detecting head for detecting the phase of rotation of motor 428; 430 is a recording head for recording the output of the aforesaid recording signal processing circuit 421 on the magnetic disc 431 as a recording medium; 431 is a magnetic disc on which signals are to be recorded by said head. These parts, or recording signal processing circuit 421, motor control circuit 424, motor 428, disc 431, magnetic head 430 and the like constitute video information recording means. A setting circuit 432 sets a shutter speed of shutter 420 and/or aperture value of diaphragm 3. When a desired value of shutter speed is set in circuit 432, the diaphragm 3 is servo-driven by automatic exposure control circuit 401, while the shutter 420 operates with the preset value. When a desired aperture value is set in circuit 432, shutter 420 is driven by automatic exposure control circuit 401, and the shutter speed is controlled, while the diaphragm 3 is held stationary at the preset value. Therefore, the photography system operates in modes analogous to the aperture priority and shutter speed priority automatic exposure modes in the film camera. A mode selector 433 serves as indicating means for indicating changeover between the still and motion picture modes. The indicating output of mode selector 433 is applied to the sequence control circuit 423. The response characteristics in the diaphragm and shutter drive circuits 405 and 411 are controlled in response to the indicating output.

Along with this, the operation timing of recording signal processing circuit 421 is controled so that in the still picture mode, one picture format of video signal information is given to head 430 with predetermined timing. In the motion picture mode, a continuous series of picture formats of video information are given to head 430 so long as switch 427 is ON. That is, mode selector 433 indicates the amount of video information to be recorded in video information recording means.

Furthermore, in the foregoing embodiments, the response characteristic in the computer means is changed in two steps, but may be in many more steps. Also the response characteristic may be varied continuously.

As has been described above, according to the electronic photography system of the invention, when the motion picture mode, a flicker-free movie can be obtained. In the still picture mode, without having to miss a good opportunity to take a picture, a proper exposure can be always obtained. Thus, an electronic camera usable as a still camera and a cine camera can be realized.

What we claim:
1. A photography system comprising:
(a) image pickup means for producing electrical signals responsive to an optical image;
(b) light information control means for controlling the state of light information entering said image pickup means;
(c) discriminating means for discriminating the controlled state of light information controlled by said light information control means;
(d) drive means responsive to an output of said discriminating means for driving said light information control means;
(e) recording means for recording an output of said image pickup means;
(f) indicating means for indicating an amount of the output of said image pickup means to be recorded by said recording means; and
(g) means for changing the response characteristic of said drive means in response to an output of said indicating means.

2. A system according to claim 1, wherein said light information control means includes a diaphragm.

3. A system according to claim 1, wherein said response characteristic includes a response speed characteristic.

4. A system according to claim 1, in which the indicating means includes means for indicating at least an indication output for recording a still picture image and an indication output for recording a movie picture image.

5. An image pick-up means, comprising:
(a) image pick-up means for converting an image of an object into a picture image signal;
(b) control means for controlling the level of the picture image signal so it appears at a predetermined level;
(c) means for recording an output of the image pick-up means; and
(d) characteristic changing means for changing the response characteristics of said control means according to the amount of output of the image pick-up means to be recorded by the recording means.

6. An image pick-up apparatus according to claim 5, in which the characteristic changing means changes the control response characteristic of the control means.

7. An image pick-up apparatus according to claim 5, in which the image pick-up means converts the image of the object into an electric picture image signal.

8. An image pick-up apparatus according to claim 5, which further comprises:
detection means for detecting the level of the picture image signal of the image pick-up means, and comparison means for comparing the output of the detection means with a predetermined level, the control means being arranged to control the level of the picture image signal of the image pick-up means on the basis of the output of the comparison means.

9. An image pick-up apparatus according to claim 5 or claim 8, in which the control means serves for controlling the amount of light incidence of the image of the object on the image pick-up means.

10. An image pick-up apparatus according to claim 9, in which the control means includes a diaphragm.

11. An image pick-up apparatus according to claim 6, in which the characteristic changing means changes the speed of response of the control means, wherein when the amount of output of said image pick-up means to be recorded is large, said changing means reduces the response speed to a level lower than a level of a time when said amount is small.

12. An image pick-up apparatus according to claim 5, which further comprises:
indication means for indicating the amount of output of the image pick-up means to be recorded by the recording means.

13. An image pick-up apparatus according to claim 12, in which the indication means includes at least a mode for indicating recordation of a still picture image and a mode for indicating recordation of a movie picture image.

14. An image pick-up apparatus, comprising:
(a) image pick-up means for converting an image of an object into a picture image signal;

(b) control menas for controlling the level of the picture image signal so it appears at a predetermined level;

(c) indication means for indicating changeover between a still mode for picking up a still picture image and a movie mode for picking up a movie picture image; and (d) characteristic changing means for changing response characteristics of the control means according to the output of the indication means.

15. An image pick-up apparatus according to claim 14, in which the characteristic changing means changes the control response speed characteristic of the control means.

16. An image pick-up apparatus according to claim 15, in which the characteritic changing means changes the reponse speed of the control means, wherein the response speed is higher in the still mode than that in the movie mode.

17. An image pick-up apparatus according to claim 14, in which the image pick-up means converts the image of the object into an electric picture image signal.

18. An image pick-up apparatus according to claim 14, which further comprises:

detection means for detecting the level of the picture image signal of the image pick-up means, and comparison means for comparing the output of the detection means with a predetermined level, wherein the control means controls the level of the picture image signal of the image pick-up means on the basis of the output of the comparison means.

19. An image pick-up apparatus according to claim 14 or claim 18, in which the control means is arranged to control the amount of light incidence of the image of the object on the image pick-up means.

20. An image pick-up apparatus according to claim 19, in which the control means includes a diaphragm.

21. An image pick-up apparatus according to claim 14, in which the indication means includes an operation switch.

22. An image pick-up apparatus according to claim 14, which further comprises:

recording menas for recording the amount of output of the image pick-up means in varied amounts according to the output of the indication means.

23. An image pick-up apparatus, comprising:

(a) image pick-up means for converting an image of an object into a picture image signal;

(b) control means for controlling the level of picture image signal so it appears at a predetermined level;

(c) indication means for indicating the amount of picture image signal to be picked up by the image pick-up means; and (d) characteristic changing means for changing response characteristics of the control means according to the output of the indication means.

24. An image pick-up apparatus according to claim 23, in which the characteristic changing means changes the response speed characteristic of the control means.

25. An image pick-up apparatus according to claim 23, in which the image pick-up means converts the image of the object into an electric picture image signal.

26. An image pick-up apparatus according to claim 23, in which the control means controls the amount of light incident of the image of the object on the image pick-up means.

27. An apparatus, comprising:

(a) image pick-up means for converting an image of an object into a picture image signal;

(b) control means for controlling the level of picture image signal so it appears at a predetermined level;

(c) drive means for driving said image pick-up means under a first control mode and a second control mode; and (d) characteristic changing means for changing control characteristics of the control means in correspondence to the control mode of said drive means.

28. An apparatus according to claim 27, wherein the characteristic changing means changes the control response characteristic of the control means.

29. An apparatus according to claim 27, wherein the image pick-up means converts the image of the object into an electric picture image signal.

30. An apparatus according to claim 27, wherein said first control mode is for picking up a still picture image and said second control mode is for picking up a movie picture image.

* * * * *